United States Patent [19]

Brenner

[11] Patent Number: 4,698,159

[45] Date of Patent: Oct. 6, 1987

[54] SEPARATING PROCESS

[75] Inventor: Max Brenner, Spiegelbergstrasse 33, 4059 Basle, Switzerland

[73] Assignees: Ciba-Geigy AG; Max Brenner, both of Basel, Switzerland; a part interest

[21] Appl. No.: 767,253

[22] Filed: Aug. 20, 1985

Related U.S. Application Data

[63] Continuation of Ser. No. 159,529, Jun. 16, 1980, abandoned.

[30] Foreign Application Priority Data

Jun. 19, 1979 [CH] Switzerland .................... 5710/79

[51] Int. Cl.$^4$ ............................................. B01D 11/04
[52] U.S. Cl. .................................. 210/634; 210/96.1
[58] Field of Search .................... 210/96.1, 377, 634; 422/258

[56] References Cited

U.S. PATENT DOCUMENTS

| | | | |
|---|---|---|---|
| 2,234,921 | 3/1941 | Webb | 422/258 X |
| 2,737,469 | 3/1956 | Anderson, Jr. et al. | 210/96.1 X |
| 2,948,676 | 8/1960 | Hutson, Jr. | 210/96.1 X |
| 3,261,672 | 7/1966 | Heinrich | 422/258 |
| 3,268,605 | 8/1966 | Boyd, Jr. | 210/96 R X |
| 3,782,624 | 1/1974 | Muller | 210/377 X |

Primary Examiner—Frank Spear
Attorney, Agent, or Firm—Harry Falber

[57] ABSTRACT

The feed mixture, from which a required substance is to be isolated, is introduced centrally into a chamber unit rotating about its axis and having two non-miscible phases flowing through it in countercurrent. Monitors responding to the substance are disposed at the two ends of the chamber unit and continuously detect the concentration of the substance and signal the measurements to a control system. By way of various valves and pumps this system controls the flow ratio of the two phases in such a manner that the concentration of the substance at one end of the unit, with respect to the corresponding concentration at the other end of the unit, remains within very low predetermined limits (e.g. 1%), so that practically the entire substance can be removed as an eluate with one of the two phases at the other end of the chamber unit (FIG. 1).

17 Claims, 3 Drawing Figures

SEPARATING PROCESS

This is a continuation of application Ser. No. 159,529, filed June 16, 1980 and now abandoned.

FIELD OF THE INVENTION

This invention relates to a process which utilises the tendency of one or more dissolved substances to assume equilibrium of distribution between two non-miscible liquid phases in a separator apparatus comprising a cylindrical chamber unit rotatable about its central axis and connected to a rotary motor drive, the unit being divided by partitions normal to the rotational axis of the unit into a plurality of chambers communicating with one another through apertures in the partitions eccentric to said axis, the flow ratio of the two phases being adjustable so that they flow through the chamber unit as counter-currents. The mixture containing the substance for isolation and accompanying substances is supplied at a location between two end chambers of the chamber unit which may comprise one or more adjacent chambers.

PRIOR ART

A separating process of this kind, and apparatus suitable for performing the same, are explained in detail in U.S. Pat. No. 3,782,624 (=German Offenlegungsschrift No. 2 154 467). In this process any active substance is separated from accompanying substances in view of the fact that the latter gradually emerge from the chamber unit initially charged with the mixture or material for separation while the required substance concentrates in the unit. This is possible because the chamber unit has two counter-currents of non-miscible liquid solvents of different densities flowing trough it.

Each substance S which has been or is dissolved in such a two-phase system is distributed over the two phases so that the resulting concentration ratio is, in a first approximation, independent of the predetermined volumes of the phases and the quantity of substance introduced. This ratio is termed the partition coefficient K. The substance S thus has the partition coefficient $K_s$ which is equivalent to the ratio $(c_o/c_u)_s$, where $c_o$ and $c_u$ denote the equilibrium concentrations of S in the lighter top phase and the heavier bottom phase respectively. Once this ratio has formed, equilibrium of concentration is established.

If S is introduced at any point, preferably into a separating chamber in the middle part of the chamber unit through which the two non-miscible liquids (the top phase and bottom phase) flow, some of S will move with the top phase in one direction and the rest will move with the bottom phase in the opposite direction, depending upon the value of $K_S$. Both fractions in these conditions reach locations where there is as yet no concentration equilibrium. This means that at each such location there is a partial change of place (transition to the respective opposite phase) of the fraction of S present there. Change of place is synonymous with change of direction of migration. Such processes take place in the unit wherever fractions of S are present. On average, the total quantity of S ultimately moves to the left with a given speed, or moves to the left and right at identical speeds, or moves to the right at a given speed. For a given phase content in the separator apparatus, the direction of migration and speed are determined solely by the partition coefficient $K_S$ and the flow ratio R of the top and bottom phases.

German Offenlegungsschrift No. 2 154 467 (U.S. Pat. No. 3,782,624) states that in the case $K_S \cdot R = 1$ the substance S "remains stationary" after being supplied to a central location in the machine. The reason for this has been explained above, because on average the left-hand and right-hand migration cancel one another out. As with any average value, there is a dispersion: the required substance S spreads uniformly left and right in the sense of a probability distribution and this applies all the more the longer the apparatus is operated, i.e. the larger the phase volumes which have flowed through the chamber unit after introduction of S. When the extension of S finally covers the entire chamber unit, the process continues in so far as S from then on emerges from the apparatus on the left and right together with the bottom and top phase outflow. The S fraction remaining in the apparatus decreases as operation continues until the chamber unit is empty: this is referred to as elution of S by the batch process.

Another batch of S (together with accompanying substances) can then be fed to the chamber unit and batch elution can be repeated. A second introduction can, however, be made before the first batch has been extracted, more particularly, S can be introduced continuously. Consequently S will no longer disappear from the apparatus. Instead the result will be a condition in which the quantities of S introduced and extracted per unit of time, are equal. In this steady state each separating chamber of the apparatus conains a characteristic quantity of S which is invariable per unit of time. If the entry chamber is in the centre of the unit, the weight distribution of S is symmetrical about the entry chamber.

The batch-wise operation for "stationary" S referred to in U.S. Pat. No. 3,782,624 (German Offenlegungsschrift No. 2 154 467), proposes discontinuing operation of the machine when elution of S starts. Accompanying substances initially introduced with S and having partition coefficients $K_B$ greater than or less than $K_S$ at that time will only partially be present, if at all, in the unit, because they will have completely or partially left the unit together with the bottom or top phase depending upon their mean direction and speed of migration. The inevitable effect of operating with $R = 1/K_S$ is that the original S-containing mixture will be depleted of accompanying substances, i.e. S is purified, and this can be realized by emptying the machine and removing the solvents (top and bottom phases) from the contents, e.g. by evaporation.

German Offenlegungsschrift No. 2 154 467 (U.S. Pat. No. 3,782,624) also discloses a continuous variant of the process in which accumulated S is continuously withdrawn from the central part of the chamber unit after a steady state distribution condition has been achieved.

In the process described in U.S. Pat. No. 3,782,624 (German Offenlegungsschrift No. 2 154 467) it is theoretically essential to comply with the condition $R = 1/K_S$ as accurately as possible.

Fluctuations in the composition and speed of introduction of the mixture, and varations in the phase flows (due to variations in the speed of rotation of the chamber unit, the hydrostatic pressures at the unit inlets, and the viscosity of the phases), and fluctuations in the room temperature, may cause difficulty in this connection. German offenlegungsschrift No. 2 154 467 (U.S. Pat. No. 3,782,624) therefore proposes checking that the above condition is maintained by means of automated analytical monitoring of the symmetrical distribution of S within the chamber unit and if necessary maintaining such condition by a control mechanism.

OBJECT OF THE INVENTION

The object of this invention is to provide a simpler and also more effective separation process of the above kind.

SUMMARY OF THE INVENTION

In accordance with this invention therefore we provide a process which utilises the tendency of more or more dissolved substances to assume equilibrium of distribution between two non-miscible liquid phases in a separator apparatus comprising a cylindrical chamber unit rotatable about its central axis and connected to a rotary motor drive, the unit being divided by partitions normal to the rotational axis of the unit, into a plurality of chambers communicating with one another through apertures in the partitions eccentric to said axis, the flow rate of the two phases being adjustable so that they flow through the chamber unit as counter-currents, and the mixture containing the substance for isolation and accompanying substances being supplied to a place between the two end chambers of the chamber unit which may comprise one or more adjacent chambers; the process comprising adjusting the flow ratio (R) of the two phases (OP, UP) so that the product of the set flow ratio (R') and the equilibrium concentration ratio ($K_s$) for the required substance (S) is not equal to 1, so that the substance (S) receives a specific direction of migration through the chamber unit, and at the same time adjusting the flow ratio so that the concentration of the required substance (S) at or near the end of the chamber unit opposite to the direction of migration of the substance has a value differing from zero but not exceeding a top threshold value.

An important point of this process is that it no longer follows the goal of distributing the substance S symmetrically over the chamber unit and controlling this distribution automatically. The reason for this is that the symmetrical distribution of S may result in an accompanying substance B of partition coefficient $K_B$ differing only slightly from the partition coefficient $K_S$ of the substance S being distributed almost symmetrically as well. In such cases an appreciable depletion of B will be impossible. It has also been found in practice that it is impossible, without losses, to withdraw the substance S centrally in the steady state of distribution since a certain percentage of S also emerges at the ends of the chamber unit with the top and bottom phases.

These losses can be readily reduced below a limit of 1% for example, if, according to the invention, a flow ratio R' is set, which is greater than or less than $R = 1/K_S$, so that S no longer "remains stationary" in the chamber unit but clearly migrates to the left or right and consequently clearly emerges with the bottom or top phase on the left or right. A result of this kind can be obtained with practically any mixture containing substance S. The only requirement is that the presence of S in the mixture should be analytically detectable; this requirement is always satisfied in practice because otherwise there would be no information available concerning the presence of substance S and hence no reason to separate such substance from the mixture.

The invention also relates to apparatus for performing the above process and comprises a cylindrical chamber unit rotatable about its centre axis, a motor drive coupled to said unit, said unit being divided, by partitions normal to the axis to define a plurality of chambers, each partition defining an aperture eccentric so said axis to provide communication with adjacent chambers, means for counter-current flow of two non-miscible liquid phases through the chamber unit, means for supplying feed mixture to one or more adjacent chambers, a first monitor for measuring the concentration of the required substance in one of the phases, said first monitor being disposed near one end of the unit in the flow path of one phase, and an automatic control system which controls the flow ratio of the two phases from the concentration values detected by the monitor, wherein the control system so controls the phase flow ratio that the substance concentration detected by the monitor does not exceed a top threshold value of 2%, with respect to the corresponding concentration at the other end of the unit.

LIST OF DRAWINGS

Preferred embodiments of the invention are explained in detail hereinbelow with reference to the accompanying drawings in which.

DETAILED DESCRIPTION OF PREFERRED EMBODIMENTS

The separator apparatus shown in FIG. 1 comprises basically a chamber unit having four series-connected sub-units $KA_1$–$KA_4$, four supply systems F for the top and bottom phases OP and UP respectively, for separation material dissolved in the top phase (referred to hereinafter as material TOP,) and material for separation dissolved in the bottom phase for separation is (referred to hereinafter as material TUP), fraction collectors FSOP and FSUP for the top and bottom phase eluates respectively, a drive motor A, common to all four sub-units, an angle coder W which detects the rotary positions of the chamber unit, four monitors $M_1$–$M_4$, various lines and valves V, and electronic control systems (combined reference ST) for the drive motor A and the valves V.

Each of the four sub-chamber units $KA_1$–$KA_4$ is identical in construction and the way they are driven is described in German Offenlegungsschrift No. 2 154 467. Each sub-chamber unit is subdivided into a plurality of chambers $K_n$ by partitions TW (FIG. 3), which are normal to the axis of rotation. The chambers communicate with one another via eccentric passages O in the partitions. The two end chambers of each sub-unit each have two liquid connections made in the form of rotary bushings, one leading into the top and one into the bottom zone of the chamber respectively for supplying and discharging the top and bottom phases and the substances dissolved therein.

Each of the drum-shaped sub-units has a ring L at each end mounted on four rollers LW, which drive them. The rollers are driven by motor A through two shafts, only one of which is shown in FIG. 1.

As already stated, the construction and drive of each chamber unit and other details of the equipment are identical with that described in German Offenlegungsschrift No. 2 154 467. The latter specification is thus expressly declared to be an integral part of this specification.

The four sub-units $KA_1$-$KA_4$ are functionally connected in series, the top phase inlet connections being connected to top phase outlet connections and bottom phase inlet connections being connected to bottom phase outlet connections. The top phase inlet connection and bottom phase outlet connection of units $KA_1$ are connected to the top phase inlet system F-OP and the bottom phase fraction collector FSUP respectively. The top phase outlet connection and bottom phase inlet connection of the fourth sub-unit $KA_4$ are connected to the top phase fraction collector FSOP and bottom phase inlet system F-UP respectively. The top and bottom phase connecting lines between the two middle units $KA_2$ and $KA_3$ are connected to the delivery systems for material TOP dissolved in the top phase and material TUP dissolved in the bottom phase.

The phase connecting lines between the units $KA_1$ and $KA_2$ and between $KA_3$ and $KA_4$ each contain one of the four monitors $M_1$-$M_4$. Monitors $M_1$ and $M_2$ detect the concentrations of the required substance S while monitors $M_3$ and $M_4$ may be designed to detect the substances accompanying the required substance S. If the required substance S is difficult to detect in the bottom phase $M_1$ or top phase $M_2$, it may be determined in the respective other phase by means of the monitors $M_3$ and $M_4$. This is possible by disposing $M_1$ and $M_3$, and $M_2$ and $M_4$ respectively at the same place in the chamber unit where the local concentrations in the top and bottom phases are in mutual relationship to one another. In practice, therefore, usually only one each of the monitors $M_1$ and $M_3$ or $M_2$ and $M_4$ is operative, the other one either being omitted or bridged or disregarded by the control system. Further details of the monitors will be given hereinafter.

The two middle units $KA_2$ and $KA_3$ each contain about 50 to 200 chambers and form the actual separating apparatus. The outer two units $KA_1$ and $KA_4$ are intended basically only as buffer stages and each contains only about 10 chambers. These figures are of course purely examples and may be varied within wide limits as required.

The four sub-units could of course be combined into a single unit, in which case care must be taken to ensure that the monitors can be suitably connected to the corresponding chambers.

To operate the separator apparatus, the chambers of the units are first charged with the top and bottom phases appropriate to the separation problem, as described, for example, in the aforementioned U.S. Pat. No. 3,782,624 (German Offenlegungsschrift No. 2 154 467). The actuation of the valves and delivery systems, etc., required for this purpose, is carried out automatically by the appropriately constructed control system ST. The feed material T containing the substance S which is required to be isolated is introduced centrally, i.e. between the two sub-units $KA_2$ and $KA_3$, and the apparatus is started with an arbitrary phase flow ratio R, e.g. 1:1, preselected by appropriate adjustment or actuation of the control system ST and then left to itself in accordance with the general principles outlined in U.S. Pat. No. 3,782,624 (Offenlegungsschrift No. 2 154 467).

For the sake of simplicity it will be assumed in the following description, that the required substance S can be readily detected in the top and bottom phases. In that case the concentrations of S in the top and bottom phases are directly detected by the monitors $M_2$ and $M_1$ and the other two monitors are inoperative.

Once the apparatus has been started, the substance S starts to migrate to the left or right through the complete chamber unit at varying speed, depending upon the selected initial flow ratio R. The control system ST is designed so that it tends to control the flow ratio of the two phases to such an extent that substance S emerges only on one side of the chamber unit—in this case, for example, on the right with the top phase—while on the other hand it has the maximum possible residence time in the chamber unit.

Depending upon the preselected flow ratio R, one of the two monitors $M_1$ and $M_2$ will first detect and respond if a predetermined bottom threshold value of the concentration of substance S is exceeded. If this is monitor $M_1$ for example, then assuming that the substance is to be withdrawn on the right as a top phase eluate, this means that the substance S is travelling in the wrong direction. The control system ST now initiates a control operation which changes the flow ratio R of the two phases in a sense such that the relative concentration of S detected by monitor $M_1$ with respect to the bottom phase concentration of S near the monitor $M_2$ does not exceed a predetermined top threshold value which, for example, may be 1-2% or less. The result of this control is that the mean direction of migration of substance S is reversed and the substance S leaves the chamber unit on the right with the top phase.

If the monitor $M_2$ is the first to respond, then although the substance S has the required direction of migration, it is moving too quickly. Monitor $M_2$ now causes control system ST to act on the phase flow ratio R to slow down the speed of migration until finally monitor $M_1$ also responds. As soon as the latter detects the minimum concentration of S corresponding to the bottom threshold value, it again takes over the flow ratio monitoring process on its own, the control criterion again being that the concentration of S at $M_1$ may not exceed the aforementioned top threshold value The resulting equilibrium flow ratio will be referred to as R'.

If, unlike the above assumption, the substance S is to be withdrawn in the form of an eluate with the bottom phase on the left-hand side of the chamber unit, the functions of $M_1$ and $M_2$ are changed over accordingly. The basic factor, therefore, is that only one of the two monitors $M_1$ and $M_2$ is responsible for controlling the flow ratio depending upon the required direction of migration of the substance S.

If the concentration of S falls below the bottom threshold value during a predetermined interval of time t after the last correction of R by the monitor responsible, this means that extraction is reaching its end. The control system then ensures that the apparatus is stopped and, for example, emits an accoustic signal to indicate that the situation should be checked. If the feed material (S+accompanying substances) as described in German Offenlegungsschrift No. 2 154 467 (U.S. Pat. No. 3,782,624) is not supplied batchwise, but "quasi-continuously" at short regualr intervals of time during operation of the apparatus, then the case in which the concentration of S falls below the bottom threshold as is typical of the batch process no longer applies. Instead, the concentration swings unrestrictedly between the two threshold values described unter continuous supervision of the appropriate monitor thus ensuring a continuous elution of S on the required side of the chamber unit with practically no losses. This applies even if the behaviour of S is affected by variations in the nature or supply of the feed material or by any change in operating parameters.

S will generally not be extracted without accompanying substances B. Each accompanying substance B having a partition coefficient $K_B$ greater than $K_S$ will in such cases appear as completely as S in the top phase extract. Even accompanying substances in which $K_B$ is slightly less than $K_S$ may still be partially extracted with the top phase. The extent to which this occurs depends not only on $K_B$ but also on the number of chambers in the unit. If these slow accompanying substances are to be removed without any loss of S, it is advisable to repeat the separating operation with the same operating parameters, again with monitor supervision as a precaution. If, in the case of a batch process, the fraction p of the original quantity $m_B$ of a slow accompanying substance passes into the top phase eluate from the first separating operation, the top phase eluate from the second separating operation will contain only the quantity $p^2 m_B$, and so on. Corresponding conditions apply as a result of repeating separation with a continuous feed.

If S was the slowest of all the substances completely eluted with the top phase—a condition which, for a given number of chambers in the unit, is satisfied to an increasing degree with increasing S concentration thresholds to be recorded by monitor $M_1$ on the bottom phase outlet side—i.e., if all the partition coefficients $K_B$ of the accompanying substances B in the top phase eluate are greater than $K_S$, batchwise or continuous separation of S is then obtained by central batchwise or quasi-continuous supply of the associated top phase eluate in a second operation in the same apparatus or a second apparatus, using the same phase pair as previously, but with a flow ratio R'' such as to produce quantitative elution of S with the emerging bottom phase while the accompanying substances B preferably emerge with the top phase. R'' is found automatically, as described in the case of R', by means of monitors $M_1$ and $M_2$, R'' being maintained by means of $M_2$.

If S contains undesirable fractions of an accompanying substance B with a partition coefficient $K_B$ only slightly greater than $K_S$, then again the separating operation will be repeated as described above—of course again with monitor supervision—until the remaining proportion of B is no longer a disturbing factor. This again applies equally to both the batch process and the continuous process.

If S emerged with the bottom phase and not, as was assumed, with the top phase in the first operation, then of course all the subsequent steps up to separation of pure S are adjusted accordingly.

The advantages of monitor-controlling one-sided elution of S after central mixture supply are that the machine can control itself from the behaviour of the required substance S, while there is another advantage which is no less significant. This concerns the degree of separation attainable with a given number of chambers in respect of S and its nearest neighbour on the partition coefficient scale. This nearest neighbour is separated either in the first or in the second operation in the example discussed hereinbelow. The separation of a mixture of equal parts S and B into an S fraction with a 99% S content and a B fraction with a 99% B content requires the least number of separating chambers when S and B leave the chamber unit simultaneously at opposite ends after having been introduced centrally. The corresponding condition for R is $R = (K_S \cdot K_B)^{-0.5}$, and the required number of chambers N can be estimated from the formula $$N = 1 + \left( \frac{\sqrt{\beta} + 1}{\sqrt{\beta} - 1} \right) \frac{9}{2}$$

the separating factor $\beta$ being the value $K_S/K_B > 1$ or $K_B/K_S < 1$. Table 1 gives a comparison between N and number of chambers $N_1$ and $N_{10}$ which would be required in the case of separation by chromatographic columns. The calculation of $N_1$ and $N_{10}$ is based on a chromatographic capacity factor k' of about 1 and 10 respectively with respect to the more slowly migrating substance. The capacity factor is defined as $k' = 1/K \cdot r$, where r denotes the volumetric mobile to stationary phase ratio in the separating system. This example of chromatographic calculation is relevant because in terms of chamber requirement it corresponds to machine operation in accordance with FIG. 9 of the U.S. Pat. No. 3,782,624 (German Offenlegungsschrift No. 2 154 467).

| $\beta$ | N | $N_{10}$ | $N_1$ | Purity of recovered S and B |
|---|---|---|---|---|
| 2 | 28 | 63 | 184 | 99.2% |
| 1.41 | 53 | 229 | 734 | 99.1% |
| 1.19 | 105 | 925 | 2800 | 99.0% |
| 1.09 | 209 | 3560 | 11200 | 98.9% |
| 1.044 | 417 | 13700 | 46500 | 98.9% |

The reduction of the number of chambers required in the case of symmetrical extraction of S and B is striking. Too few chambers means that symmetrical extraction results in incomplete separation of S and B and losses of S, since some of S remains in the B fraction, and vice versa. Monitor-controlled operation readily remedies this, since it allows any required compromise between purity and yield of S by automatic adjustment of the flow ratio R.

In the monitor-controlled operation described above the flow ratio R is set by two monitors $M_1$ and $M_2$ followed by control of R by just one monitor. Of course one monitor could be dispensed with by adjusting R manually and only then using a monitor to check and carry out any required adjustments of R.

A common feature of the process variants explained above is that the mixture is introduced substantially centrally and the or each monitor is disposed near the ends of the respective chamber unit. For certain batch processes, however, it may be advantageous to move the mixture entry point away from the centre of the chamber unit as in FIG. 2 which shows a modified separator apparatus in which the control system ST has been omitted for the sake of clarity. Like parts in FIGS. 1 and 2 have like references.

Figure 1:
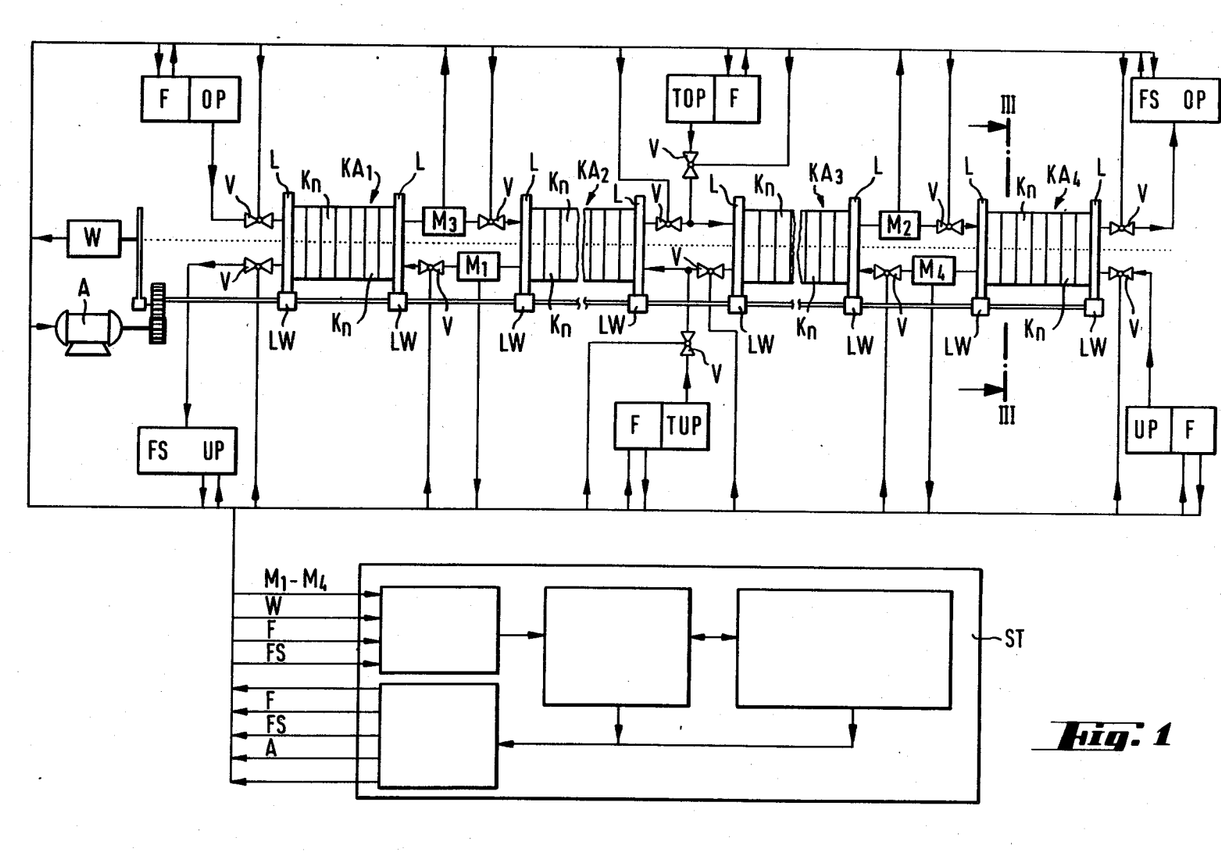
FIGS. 1 and 2 each show one embodiment of apparatus suitable for performing a process in accordance with this invention.
Figure 2:
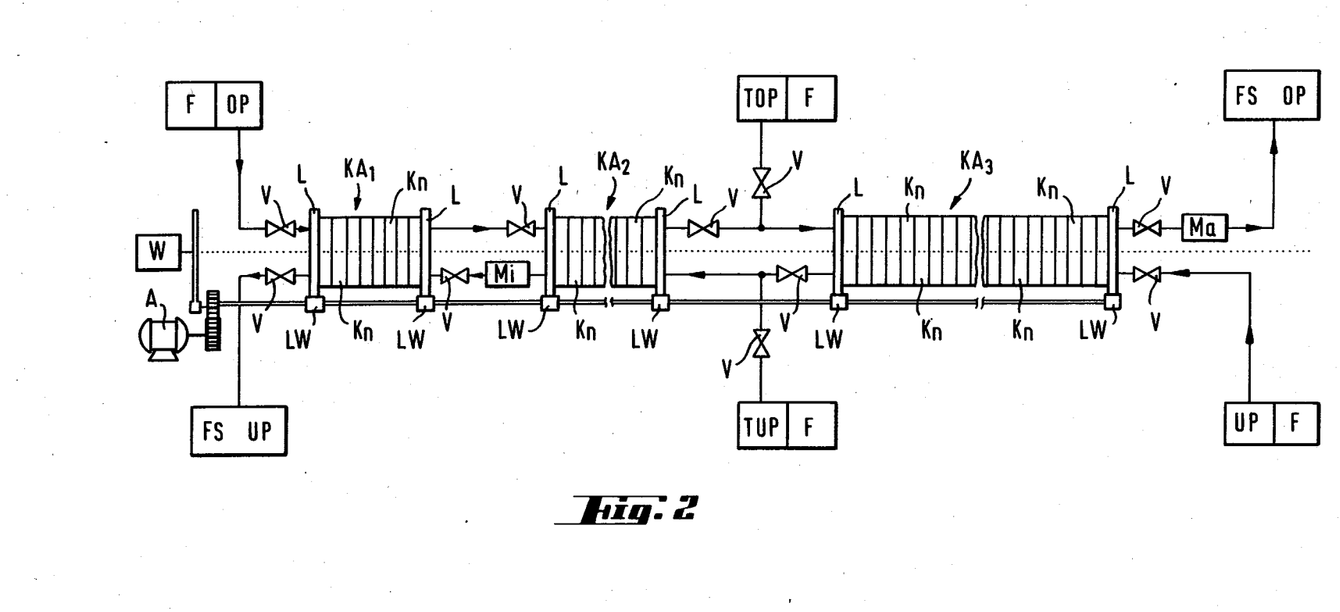

The main difference from the apparatus shown in FIG. 1 is that the chamber unit now comprises only three sub-units $KA_1$–$KA_3$ instead of four. The first of these again acts mainly as a buffer while the other two perform the actual separating function. Sub-unit $KA_3$ has approximately twice as many chambers as sub-unit $KA_2$. The entry point is between these two sub-units. The total number of chambers of course depends very much on the specific separating problem or the degree of separation required.

An inner monitor $M_i$ is connected between the first and second sub-units $KA_1$ and $KA_2$ in the bottom phase connecting line and corresponds basically to the monitor $M_1$ shown in FIG. 1. The top phase outlet line contains an outer monitor $M_a$ which corresponds to monitor $M_2$ in FIG. 1. The two monitors are intended to respond to substance S in suitable phases. Of course, if S is difficult for $M_i$ to detect, a monitor responding to S could again be provided in the other phase line as in FIG. 1.

If there is a mixture of three substances A, S and B to separate, for example, with $K_A < K_S < K_B$ and $K_S/K_A = \alpha$, $K_B/K_S = \beta > \alpha > 1$, it is advantageous for the initial value of the flow ratio to be $R = 1/K_A$ and for the entry chamber or chambers to be located at a place such that the separating unit $KA_2 + KA_3$ is divided up approximately in a ratio of 1:2, the monitor being located between the two sub-units $KA_1$ and $KA_2$, the top phase being introduced at the end adjacent the monitor $M_i$. Assuming that the inner monitor $M_i$ ensures that only traces of S emerge with the bottom phase (on the left), this effect being obtained by means of two predetermined concentration threshold values of S, and if the apparatus is allowed to operate until S starts to emerge with the top phase (on the right), then the following are obtained in the fraction collectors FSUP and FSOP at the ends of the unit:

(a) A fraction of pure A in the bottom phase;
(b) A fraction of A with traces of S in the bottom phase;
(c) A fraction of pure B in the top phase;
(d) A fraction of B with traces of S in the top phase;
(e) A fraction in the chamber unit, containing all of S together with any residues of A and/or B.

Any quantities of A and/or B still present can be removed from fraction (e) by repeating the separation operation.

If several qualitatively identical mixtures of A, S and B are to be separated by batch processing, it is advisable to carry out each operation with a different phase volume ratio r in the chamber unit so that the effect of r, which, in batch operation, often is considerable with respect to degree of separation, separating time and solvent consumption, can be quantitatively assessed in order to optimize the process from this aspect as well. If a large number of chambers is available, a batch process of this kind is the preferred type of operation for batch processing of the mixture. Separation is more reliable than in the case of the process explained with reference to FIG. 12 in U.S. Pat. No. 3,782,624 (German Offenlegungsschrift No. 2 154 467, whether with or without monitors, as proposed on page 31 of that specification.

The monitors used must measure a variable which directly or indirectly represents a function of the concentration of S. If this variable is not affected by accompanying substances, it is sufficient to take the phase flow for monitoring through a measuring cell as already proposed in U.S. Pat. No. 3,782,624 (German Offenlegungsschrift No. 2 154 467). Examples of such measurements are absorption or emission measurements (fluorescence or luminescence) in the ultraviolet, visible and infra-red zones of the electromagnetic spectrum, including atomic absorption, measurements of refractive index, optical rotation, dielectric constants, sound absorption, conductivity, thermal capacity, electrical potentials (pH), pI, where I is an ion or another activity which can be directly or indirectly detected potentiometricylly (e.g. enzyme electrodes), current/voltage values (voltametry), and finally measurement of the radiation of radioactive tracer substances or the mass-spectrometric measurement of isotope-labelled tracers.

If, however, the variable is affected by accompanying substances, the monitor must initially subject a sample of the phase to analytical separation and only then take the measurement. Examples of suitable means for this purpose are automated chromatographs (linear or circular thin-layer chromatography, high-resolution high-speed column chromatography with a liquid mobile phase, and gas chromatography) either on their own or, for example, in combination with a mass spectrometer. All these types of apparatus are available commercially.

The individual function units of the electronic control system are also available commercially or come within the knowledge of those versed in the art. The control system comprises basically only ordinary control circuits which compare predetermined or manually input set-values with actual-values provided by the monitors or, for example, and angle coder W, and produce a change of the relevant variable in the required direction via appropriate control means.

The monitors are advantageously interrogated at predetermined intervals of time. The length between such intervals is preferably an inverse proportion to the deviation between the actual-value and the set-value, and vice-versa.

The phase flow ratios can be controlled or influenced in the most diverse ways. For example, the levels of the phase reservoirs can be changed when controlling the phase flow via the hydrostatic pressure, or the piston stroke can be adjusted in the case of piston pumps. The flow ratio can also be controlled by way of the sequence of valve operations which determine how many top phase feed pulses are associated with a bottom phase feed pulse, or by changing the arc length or duration during which the top and bottom phases can flow during one revolution of the chamber unit.

The first three types of control of the flow ratio may be used for rough control purposes and the final type for fine control.

According to the electronic control system described in U.S. Pat. No. 3,782,624 (German Offenlegungsschrift No. 2 154 467), the opening and closing periods of the various valves are controlled by time switching stages started by contacts actuated by cams on the periphery of the chamber unit. According to one advantageous aspect of this invention, the control system ST has no such time switching stages. Instead, it controls the appropriate functions in direct dependency on the rotary position of the chamber unit, this position being continuously detected by the angle coder W. In this way, the control system is completely independent of changes in speed and is much more flexible and simpler to operate.

It has surprisingly been found that the position of the phase boundary in the individual separating chambers of the unit depends upon the rotary position of the communicating apertures O in the partitions TW at the time when the bottom phase flow starts or stops. In order to keep the phase boundary constant, therefore, the position of the apertures O must also be kept constant during operation of the separating unit. This can be achieved much more readily and simply with the control system based on the angle of rotation than with the timer control system according to the U.S. Pat. No. 3,782,624 (German Offenlegungsschrift No. 2 154 467).

Figure 3:
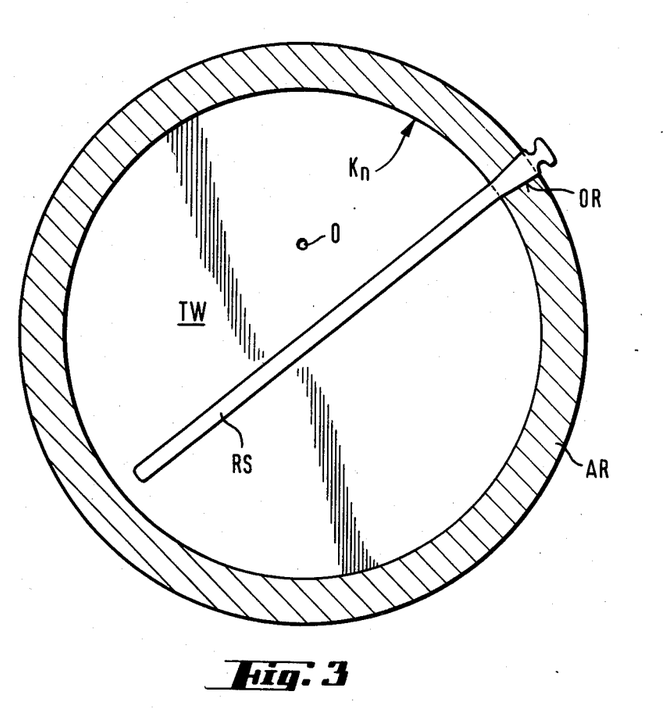
FIG. 3 is a detail section on the line III—III in FIG. 1.

FIG. 3 shows an individual chamber $K_n$ of a chamber unit in cross-section to an enlarged scale. The chamber comprises basically a ring AR and a partition TW with the communication aperture O. The ring AR has an opening OR closed by a rod RS. The ring opening is used for taking samples from the chamber and is also opened during the introduction of the top and bottom phases. Rod RS acts as a seal for the ring opening and also as an agitator. Experiments have shown that the separating capacity of the chamber unit is improved by this agitator rod.

The partition TW of each chamber $K_n$ consists of a material which can be satisfactorily wetted by one or other phase. According to one particularly advantageous construction of the chamber unit, the chamber partitions may comprise different materials so that each partition which can be satisfactorily wetted by the top phase, for example, is followed by a partition which can be satisfactorily wetted by the bottom phase, and vice versa. The partitions could also, for example, be of a nature such or so treated as to be wettable more satisfactorily by one phase on one side and more satisfactorily by the other phase on their other side. All these steps can, of course, be varied and combined as desired and result in a better separating performance of the chamber unit.

In the above-described examples of the separating process according to the invention, the direction and speed of substance migration are controlled by varying the flow ratio R of the two phases. Since the direction of migration of a given substance S depends upon the product $K_s \cdot R$, the substance behaviour can theoretically also be influenced by a monitor-controlled changed of $K_S$. However, whereas a change of R equally affects all the products R·R, i.e. the speeds of migration of all substances in the chamber unit, changes of those parameters (temperature, and phase composition) which individually affect each partition coefficient K may result in a change of the sequence on the scale of K-values. Consequently, conceivable commands towards controlling the behaviour of the substance by changing the room temperature, the pH in the incoming bottom phase, the quantitative composition of ternary two-phase systems, and the like, during plant operation are appropriate only in exceptional cases. Of course there is nothing to prevent the monitor signals from being processed accordingly.

What is claimed is:

1. A process which utilises the tendency of one or more dissolved substances to assume equilibrium of distribution between two non-miscible liquid phases in a separator apparatus comprising a cylindrical chamber unit rotatable about its central axis and connected to a rotary motor drive, the unit being divided by partitions normal to the rotational axis of the unit, into a plurality of chambers communicating with one another through apertures in a partitions eccentric to said axis, the flow rate of the two phases being adjustable so that they flow through the chamber unit as counter-currents, and the mixture containing the substance for isolation and accompanying substances being supplied to a place between the two end chambers of the chamber unit which may comprise one or more adjacent chambers; the process comprising monitoring the concentration of a substance (S), adjusting the flow ratio (R) of the two phases (OP, UP) so that the product of the set flow ratio (R') and the concentration ratio ($K_s$) for the required substance (S) is not equal to 1, so that the substance (S) receives a specific direction of migration through the chamber unit, and at the same time adjusting the flow ratio so that the concentration of the required substance (S) at or near the end of the chamber unit opposite to the direction of migration of the substance has a value differing from zero but not exceeding a top threshold value.

2. A process according to claim 1, including selecting the top threshold value for the concentration of the substrate (S) with respect to the concentration of the substance at the front end of the chamber unit to be not more than 2%.

3. A process according to claim 1, including continuously monitoring the concentration of the substance (S) at the said rear end of the chamber unit and controlling the flow ratio of the two phases (OP, UP) in accordance with the concentration values detected by monitoring.

4. A process according to claim 3, including determining the concentration of the required substance (S) at intervals, the length of which is in inverse proportion to the magnitude of the deviation of the measured concentration from the set-value.

5. A process according to claim 1, including monitoring the concentration of the substance (S) at or near the front end of the chamber unit in the direction of migration of the substance and controlling the flow ratio (R) of the two phases (OP, UP) in accordance with the monitored concentration.

6. A process according to claim 5, including monitoring the concentration of the substance (S) at the front end of the chamber by a second automatic monitor ($M_2$), using an arbitrary flow ratio, e.g. 1:1, for the two phases in an initial stage, and then automatically setting the flow ratio to the correct value from the concentration values determined by the two monitors ($M_1$, $M_2$).

7. A process according to claim 1, including supplying the mixture (T) approximately at the centre of the chamber unit and removing the eluate with the substance (S) required at the front end thereof.

8. A process according to claim 7, including subjecting the eluate with the required substance (S) to the same treatment steps as the initial mixture in the same separator apparatus or in another separator apparatus of identical construction, and adjusting the flow ratio (R) of the two phases (OP, UP) so that the direction of migration of the required substance (S) with respect to the two phases is the opposite to the original direction of migration.

9. A process according to claim 8, including repeating the treatment steps with either direction of migration, and using the eluate containing with the required substance (S) from each previous pass as the feed mixture during each repeat of the treatment steps.

10. A process according to claim 7, carried out continuously.

11. A process according to claim 1, including supplying the mixture (T) at about one-third of the total length of the chamber unit, counting from its rear end, and discontinuing operation when the concentration of the required substance (S) at the front end of the chamber unit reaches a predetermined threshold value.

12. A process according to claim 11, including withdrawing the required substance (S) from the liquid in the chamber unit.

13. A process according to claim 1, including subjecting to the same treatment steps as the initial mixture (T), if necessary after concentration, in two or more identical cycles, the eluate from the previous cycle, or the chamber unit contents with the required substance (S) from the previous cycle.

14. Apparatus for separating desired substances from a feed mixture, comprising a cylindrical chamber unit rotatable about is centre axis, a motor drive coupled to said unit, said unit being divided by partitions normal to the axis to define a plurality of chambers, each partition defining an aperture eccentric to said axis to provide communication with adjacent chambers, means for counter-current flow of two non-miscible liquid phases through the chamber unit, means for supplying feed mixture to one or more adjacent chambers, a first monitor comprising means for taking samples from one of the phases flowing through a first sampling chamber within said cylindrical chamber unit, means for automated chromatographic separation of a desired solute S from other solutes present in the sample, and means for concentration measurement in the S-containing fractions, said first sampling chamber being disposed near one end of the cylindrical chamber unit, and an automated control system which controls the flow ratio of the two phases from the concentration values detected by the monitor, wherein the control system so controls the phase flow ratio that the S substance concentration detected by the monitor does not exceed a top threshold value of 2%, with respect to the corresponding concentration at the other end of the unit.

15. Apparatus according to claim 14, further including a second monitor comprising means for taking samples from either one of the phases flowing through a second sampling chamber within said cylindrical chamber unit, means for automated chromatographic separation of a desired solute S from other solutes present in the sample, and means for concentration measurement in the S-containing fractions, said second sampling chamber being disposed near the end of the cylindrical chamber unit remote from the first sampling chamber, and wherein the control system fully automatically adjusts the flow ratio of the two phases starting from an arbitrary initial value by reference to the measurements supplied by the two monitors so that the concentration value detected by the first monitor does not exceed the said top threshold value.

16. Apparatus according to claim 15, including an angle coder detecting the rotary position of the chamber unit and wherein the control system determines the flow and standstill times for the two phases from the chamber unit rotary positions detected by the angle coder.

17. Apparatus according to claim 16, wherein the partitions have different wetting properties with respect to the two phases.

* * * * *